United States Patent [19]

Tanaka et al.

[11] Patent Number: 4,490,029
[45] Date of Patent: Dec. 25, 1984

[54] CAMERA WITH A FRAMING MIRROR

[75] Inventors: Harumi Tanaka, Kobe; Hiroshi Ueda, Nara; Keisuke Maeda, Sakai; Akira Yoshizaki, Osaka, all of Japan

[73] Assignee: Minolta Camera Kabushiki Kaisha, Osaka, Japan

[21] Appl. No.: 505,597

[22] Filed: Jun. 20, 1983

[30] Foreign Application Priority Data

Jun. 21, 1982 [JP] Japan ................... 57-107371

[51] Int. Cl.³ .............. G03B 9/64; G03B 13/02; G03B 17/24
[52] U.S. Cl. .................. 354/106; 354/220; 354/237
[58] Field of Search .......... 354/106, 237, 289, 295, 354/220

[56] References Cited

U.S. PATENT DOCUMENTS 4,159,170 6/1979 Kuramoto et al. ............. 354/295

FOREIGN PATENT DOCUMENTS 47-10230 4/1972 Japan .
56-16579 4/1981 Japan .

Primary Examiner—Michael L. Gellner
Attorney, Agent, or Firm—Wolder, Gross & Yavner

[57] ABSTRACT

A framing mirror provided on the front part of a camera for enabling observation of the range of the scene to be photographed from the front of the camera is used for various displays by a liquid crystal display device. Various operation modes are set by a mode selection member and the state of the display portion of the liquid crystal display device arranged in front of the framing mirror changes in accordance with the set operation mode to effect various displays. In at least one of the operation modes the whole display portion of the liquid crystal display device becomes transparent, whereby it is possible to observe the framing mirror from the front of the camera. Alternatively, the framing mirror has a transparent portion at a marginal position and the liquid crystal display device is arranged behind the transparent portion so as to be observable from the front of the camera. The liquid crystal display device displays the same data as displayed by another liquid crystal display device which is arranged behind the framing mirror, for recording data on a photographic film.

16 Claims, 10 Drawing Figures

CAMERA WITH A FRAMING MIRROR

BACKGROUND OF THE INVENTION

1. Field of the Invention

The present invention relates to a camera provided with a framing mirror at its front part to enable observation of the range or field of the scene to be photographed from the front of the camera.

2. Description of Prior Arts

In self-timer photography with a camera supported for example by a vertical wall, it often occurs that a picture of a photographer, i.e., a person standing in front of the camera is not properly taken because of the failure of proper framing, i.e., because the scene to be photographed cannot be confirmed by observation through a viewfinder of the camera before photographing. To eliminate such a failure in self-timer photography, there has been proposed a camera provided with a light emitting indication member which can be observed from any position within the range of the scene to be photographed. Herein the field or range of the scene to be photographed means the scene within the picture taking angle of objective or picture taking lens of the camera. However, this camera suffers from a drawback that the indication member is hardly observable in bright places because a small size light emitting element such as a light emitting diode is used as the indication member. In addition, although it is possible to confirm that the person is located at a position within the range of the scene to be photographed it is not possible to confirm the background of the scene at the rear of the person.

A camera which can eliminate these drawbacks has been proposed in copending U.S. patent application for "THIN FLAT CAMERA" filed on May 5, 1983 and assigned to the same assignee (Ser. No. 06/491,846). The camera disclosed by this copending patent application is provided with a relatively large size framing mirror at a substantially central portion of its front part such that, through observation of the framing mirror, a person in front of the camera can confirm the background as well as whether he or she is within the range of the scene to be photographed.

Additionally, Japanese utility model publication No. Sho. No. 47-10230 discloses a camera having a similar framing mirror at a side portion of its front part.

SUMMARY OF THE OBJECT

It is an object of the present invention to provide a camera with a framing mirror, in which the framing mirror is commonly used for displays by a liquid crystal display device.

In cameras according to first and second embodiments of the present invention, a liquid crystal display device is arranged behind a framing mirror. A mode selection member is provided for setting various operation modes and circuit means coupled to the mode selection member changes the state of a display portion of the liquid crystal display device in accordance with the operation mode set by the mode selection member. In at least one of the operation modes, the circuit means causes the whole display portion of the liquid crystal display device to become transparent, whereby it becomes possible to observe the framing mirror from the front of the camera. Various displays are made by the liquid crystal display device in accordance with the change of the state of the display portion.

In a camera according to a third embodiment of the present invention, a framing mirror has a transparent portion at a marginal position and a first liquid crystal display device of a light reflection type is arranged behind the transparent portion of the framing mirror. Behind the framing mirror and adjacent to the first liquid crystal display device there is also arranged a second liquid crystal display device of a light transmission type. A light source disposed between the framing mirror and the second liquid crystal display device emits a light toward the second liquid crystal display device. A data recording optical system transmits the light from the light source having passed through the second liquid crystal display device toward the given position on the camera focal plane of a picture taking lens. The first and second liquid crystal display devices are driven by circuit means to display common data. As the position of the framing mirror at which it is transparent is determined to correspond to the above given position on the focal plane of the picture taking lens, the common data can be observed from the front of the camera at the same position as it is recorded on photographic film located on the focal plane of the picture taking lens.

The above and other objects and features of the present invention will become more apparent from the following description of the preferred embodiments of the present invention taken in conjunction with the accompanying drawings.

BRIEF DESCRIPTION OF THE DRAWINGS

FIGS. 1 through 6 show a camera according to a first embodiment of the present invention wherein;

FIG. 1 is a front perspective view of the camera;

FIG. 2 is an exploded perspective view showing a relative arrangement between the framing mirror and the liquid crystal display device;

FIG. 3 is a cross-sectional view of the liquid crystal display device provided in the front portion of the framing mirror;

FIG. 4 is a circuit diagram showing the electrical circuit in the camera;

FIGS. 5 and 6 are plan views showing the arrangement of the electrodes in the liquid crystal display device;

FIGS. 7 and 8 show the essential part of the camera according to a second embodiment of the present invention, wherein FIG. 7 is perspective view of a mode selection member and surrounding members and FIG. 8 is a circuit diagram of a liquid crystal drive circuit.

DESCRIPTION OF THE PREFERRED EMBODIMENT

Figure 1:
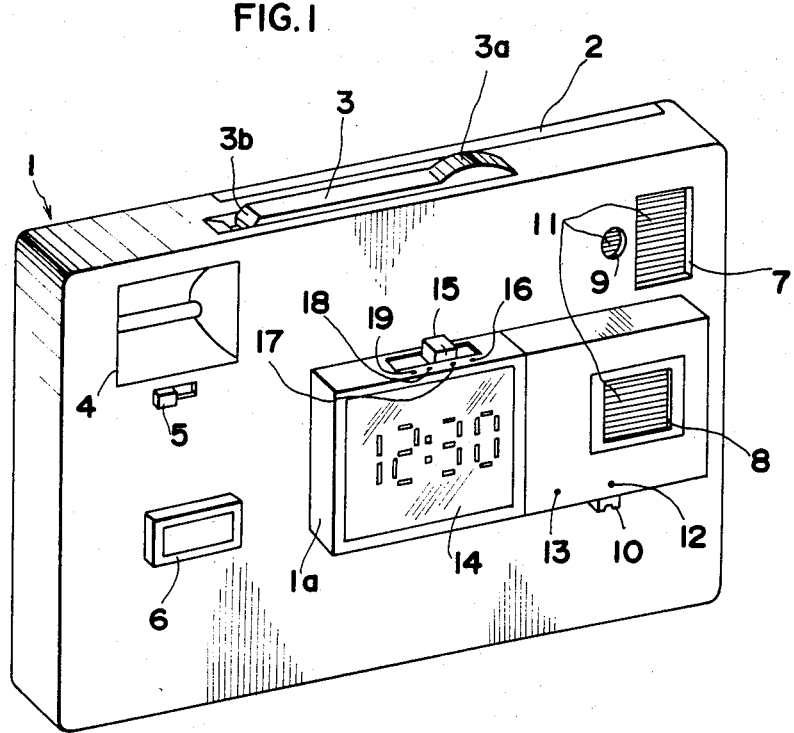

Next, with reference to the drawings, embodiments of the present invention will be described, wherein the present invention is applied to a camera using a disc film cartridge described in U.S. Pat. No. 4,309,096.

Referring to FIGS. 1 through 6 showing the first embodiment, a camera 1 is generally of a flat rectangular configuration and provided with a rear cover 2 at its rear part. When the rear cover is opened, a disc film cartridge can be inserted into or taken out of the camera. A locking release member 3 is provided at the upper part of camera 1 with one end 3a pivotted about a not shown axis extending in the forward and backward direction. When the other end 3b of locking release member 3 is lifted to rotate it clockwise, rear cover 2 can be opened. In contrast, cover 2 is locked when it is closed and locking release member 3 is returned to the position shown in FIG. 1.

On the front wall of camera 1, there are provided a light emitting portion 4 of an electronic flash device, a power source switch operation member 5 for the electronic flash device, camera release button 6, an eye-level viewfinder window 7, a picture taking lens window 8, a light receiving element window 9 for light measurement, a framing mirror 20 having a negative power as described below and a liquid crystal display device 14. Windows 7, 8 and 9 are closed by an integral cover member 11. When a cover operating member 10 provided below window 8 registers with an indicium 12 as shown in FIG. 1, cover member 11 is then in a position to close windows 7, 8 and 9 and when cover operation member 10 is registers with an indicium 13, cover member 11 is retracted from windows 7, 8 and 9.

The operation modes of liquid crystal display device 14 are controlled by a liquid crystal drive circuit described below depending upon with which indicium among indicia 16, 17, 18 and 19 selection member 15 registers. When mode selection member 15 registers with indicia 16, 17, 18 and 19, respectively, a light blocking mode, a clock mode displaying an hour and a minute, a calender mode displaying a month and a day and a self-timer mode are selected, respectively.

Figure 2:
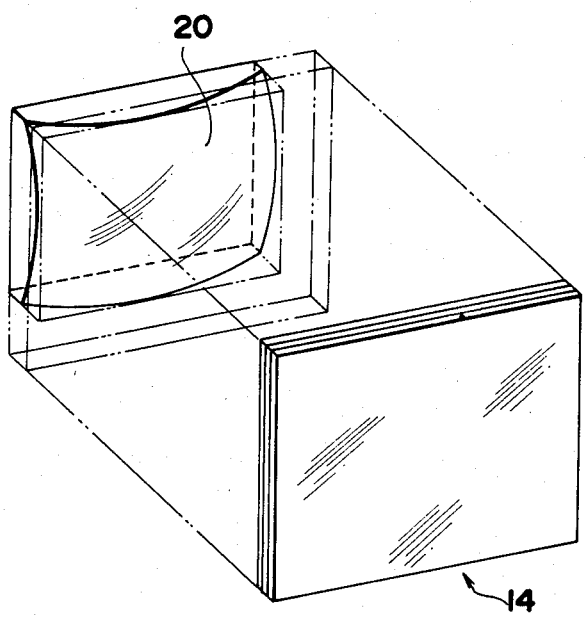

Framing mirror 20 is composed of a convex mirror as shown in FIG. 2 and is fixedly arranged in a frame 1a on the front wall of camera 1. This framing mirror 20 is substantially perpendicular to the direction of the optical axis of a not shown picture taking lens provided behind window 8. When framing mirror 20 is observed from the front of camera 1, it mirrors the range of the scene which is to be photographed.

Figure 3:
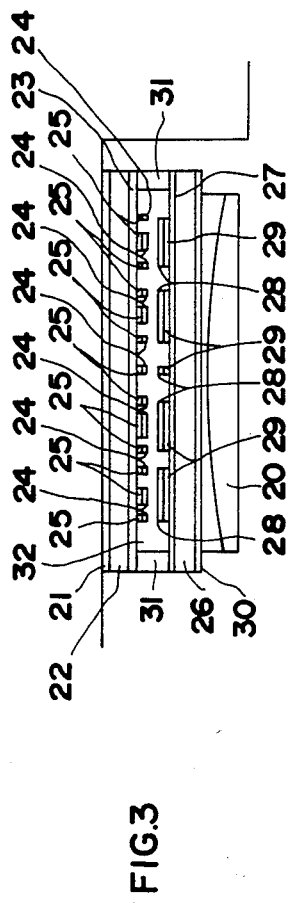
Figure 5:
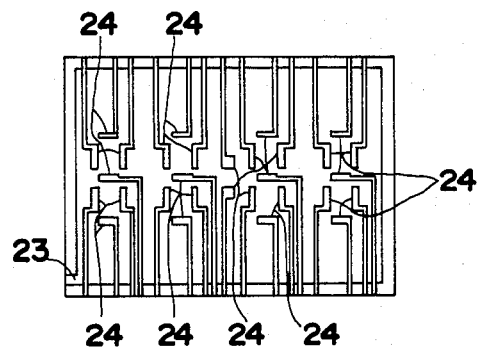
Figure 6:
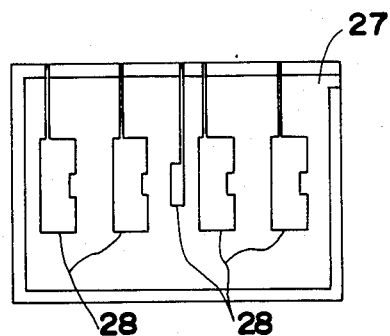

FIGS. 3, 5 and 6 show the construction of liquid crystal display device 14 provided at the front of framing mirror 20. Polarizing plates 21 and 30 are fixedly provided on the front end and rear end portions of the display device respectively such that their polarizing axes are oriented in the same direction.

At the inner sides of polarizing plates 21 and 30 there are provided glass plates 22 and 26 and further overall transparent electrodes 23 and 27 are provided at the inner sides of the glass plates 22 and 26. Transparent electrodes 24 and 28 used as segments for displaying numerals are provided on electrically insulating transparent plates 25 and 29 at the inner sides of transparent electrodes 23 and 27. A liquid crystal material fills the space enclosed by glass plates 22 and 26 and spacers 31. Transparent electrodes 24 and 28 are shaped as shown in FIGS. 5 and 6, enabling the display of numerals representing months, days, hours and minutes. The liquid crystal material is known and a twist-nematic type liquid crystal material, for example, is used in this embodiment.

When no voltage is applied between whole transparent electrodes 23 and 27 and between segment transparent electrodes 24 and 28, a light incident from the front of liquid crystal display device 14 is polarized in passing through front polarizing plate 21 and passes through glass plate 22 as it is. Then the light is rotatorily polarized by an angle of about 90° in liquid crystal material 32 and it passes through another glass plate 26. Therefore, the light incident on polarizing plate 30 is the rotary polarized light whose direction of polarization is deviated by about 90° from the direction of the polarizing axis of polarizing plate 30 and thus it is blocked by polarizing plate 30. Accordingly, no light reaches framing mirror 20 to be reflected thereby, so that the whole display portion in liquid crystal display device 14 looks dark.

In contrast thereto, when a voltage is applied between whole transparent electrodes 23 and 27 or between segment transparent electrodes 24 and 28, an electric field is generated, which forces particles of the corresponding parts of liquid crystal material 32 to orient in the same direction of the electric field, whereby the parts of the liquid crystal materials lose the ability of rotatorily polarizing a light so that a light indicent from either side of polarizing plate 21 or 30 is allowed to pass through the other polarizing plate. Accordingly, a light from a scene passing through the parts of liquid crystal material 32 to which the electric field is applied, and passing through liquid crystal display device 14 is reflected by framing mirror 20, and thereafter passes through the same parts of liquid crystal material 32 again to exit from liquid crystal display device 14. Therefore, when this device 14 is observed from the front of the camera, only electrode parts with voltage applied as described look transparent.

Figure 4:
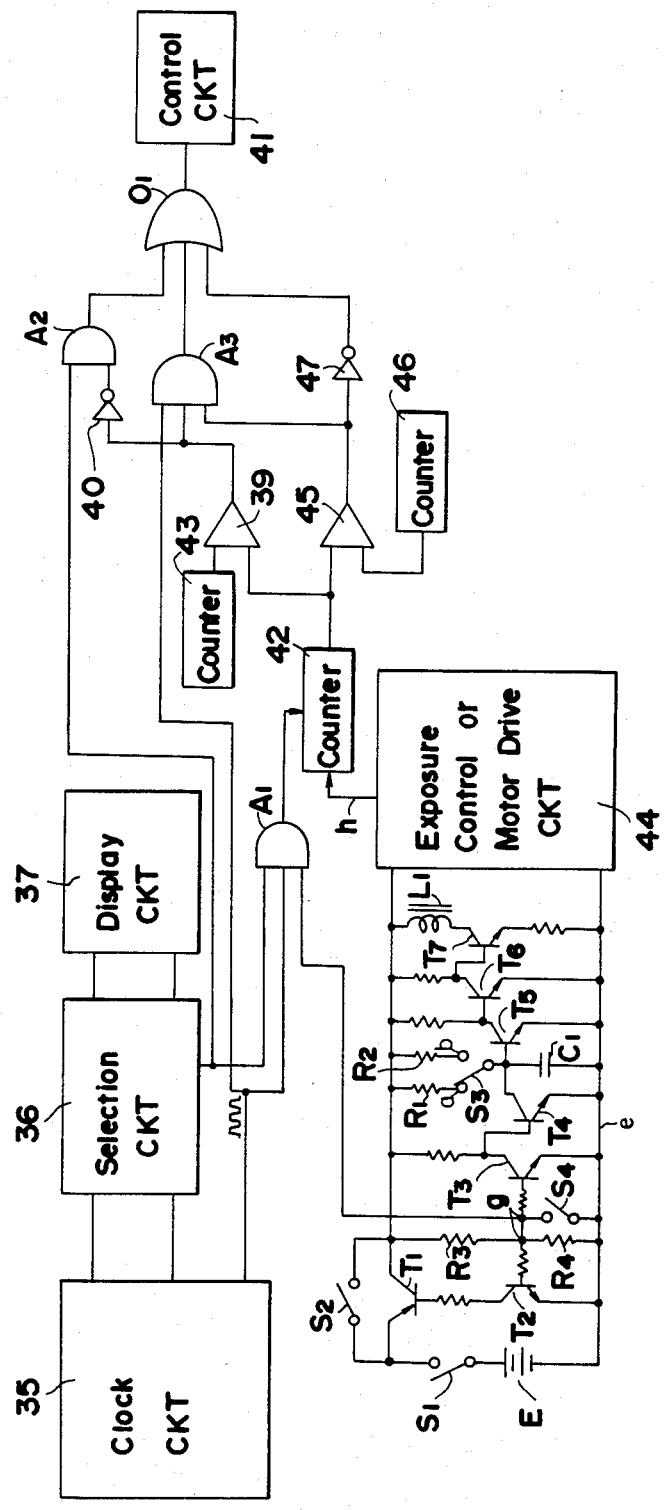

Referring to FIG. 4 showing an electrical circuit in camera 1 which includes the liquid crystal drive circuit for driving liquid crystal display device 14, a digital clock circuit 35 generates digital signals representing months and days as well as digital signals representing hours and minutes to a selection circuit 36 and also generates clock pulses for a self-timer display described below to AND circuits $A_1$ and $A_3$. Selection circuit 36 is interconnected with selection member 15 to change over its outputs. When selection member 15 registers with indicium 17, digital signals representing hours and minutes from clock circuit 35 are fed to a display circuit 37 through selection circuit 36 and when selection member 15 registers with indicium 18, digital signals representing months and days from clock circuit 35 are fed to the display circuit 37 through selection circuit 36. Display circuit 37 applies a voltage to segment electrodes 24 and 28 in accordance with the digital signals fed thereto. When a digital signal representing an hour and a minute or a month and a day is fed to the display circuit as above, the latter causes liquid crystal display device 14 to display the hour and the minute or the month and the day. In contrast thereto, when selection member 15 registers with indicium 19, selection circuit 36 generates a signal to display circuit 37 to apply a voltage to all segment electrodes 24 and 28 and also generates a "high" signal to AND circuits $A_1$ and $A_2$. Furthermore, when selection member 15 registers with indicium 16, neither the "high" signal to AND circuits $A_1$ and $A_2$ nor a signal to display circuit 37 generated from selection circuit 36.

On the other hand, $S_1$ is a power source switch which closes when cover member 11 shown in FIG. 1 is retired from windows 7, 8 and 9, $S_2$ is a switch which closes when release button 6 is depressed, $S_3$ is a changing-over switch which is changed to a side (a) with selection member 15 transferred to any one of indicia 16, 17 and 18 and to a side (b) with selection member transferred to indicium 19, and $S_4$ is a switch which closes in response to the completion of a shutter closing and opens in response to a shutter cocking operation. The base of a transistor $T_1$ provided in parallel with switch $S_2$ is connected to the collector of a transistor $T_2$ whose emitter is connected to a ground line (e), and the bases of transistors $T_2$ and $T_3$ are connected to the junction between voltage dividing resistors $R_3$ and $R_4$. The collector of transistor $T_3$ is connected to the base of transistor $T_4$, whose collector and emitter are connected in parallel with capacitor $C_1$ and either resistor $R_1$ or $R_2$ is selectively connected to capacitor $C_1$ through switch $S_3$. It should be noted that the resistance value of resistor $R_2$ is extremely larger than that of resistor $R_1$. As will be described hereinafter, while a shutter release is performed immediately after closure of switch $S_2$ when resistor $R_1$ is connected to capacitor $C_1$ through switch $S_3$, the shutter release is performed about ten seconds after closure of switch $S_2$ when resistor $R_2$ is connected to capacitor $C_1$ through switch $S_3$. The duration of 10 seconds is the period of the self-timer operation. Further, the junction of capacitor $C_1$ and switch $S_3$ is connected to the base of transistor $T_5$, the collector of transistor $T_5$ connected to the base of transistor $T_6$, and the collector of transistor $T_6$ connected to the base of transistor $T_7$, and the collector of transistor $T_7$ is connected to an electromagnet $L_1$ for shutter release, respectively. Shown at 44 is an exposure control circuit or a motor drive circuit including a motor rotating a disc film by one frame and performing a shutter cocking. Circuit 44 generates a reset signal from a terminal (h) to a counter 42 provided for self-timer photography, upon the completion of a shutter closing or upon completion of a shutter cocking.

AND circuit $A_1$ is provided with a first input terminal to which the "high" signal is fed from selection circuit 36 only with selection member 15 registered with indicium 17, a second input terminal to which clock pulses are fed from clock circuit 35 and a third input terminal connected to junction (g) between resistors $R_3$ and $R_4$. Counter 42 for self-timer photography counts the clock pulses from clock circuit 35 passing through AND circuit $A_1$. When counter 42 has counted a given number of the clock pulses, i.e., for example, when 8 seconds have elapsed from the closure of switch $S_2$ by depression of release button 6, its output level becomes higher than the output level of a fixed counter 43. Furthermore, when counter 42 has counted another given number of the clock pulses in addition to the above given number of the clock pulses, i.e., for example, when 2 seconds have further elapsed, its output level becomes higher than the output level of another fixed counter 46. A comparison circuit 39 compares the output of counter 42 with that of fixed counter 43 to generate a "high" signal when the former output becomes higher than the latter one. Similarly, comparison circuit 45 compares the output of counter 42 with that of fixed counter 46 to generate a "low" signal when the former output becomes higher than the latter one. AND circuit $A_2$ is provided with a first input terminal to which a "high" signal is fed from selection circuit 36 only with selection member 15 registered with indicium 17 and a second input terminal connected to the output terminal of comparison circuit 39 through an inverter 40. AND circuit $A_3$ is provided with a first input terminal to which clock pulses from clock circuit 35 are fed, a second input terminal connected to the output terminal of comparison circuit 39 and a third input terminal connected to the output terminal of comparison circuit 45. OR circuit $O_1$ is provided with first and second input terminals connected to the output terminals of AND circuits $A_2$ and $A_3$ respectively and a third input terminal connected to the output terminal of comparison circuit 45 through an inverter 47. A control circuit 41 is provided to apply a voltage to whole transparent electrodes 23 and 27 only when the output of OR circuit $O_1$ is high.

Meanwhile, in the electrical circuit of FIG. 4, the liquid crystal drive circuit for liquid crystal display device 14 is composed of selection circuit 36, display circuit 37, control circuit 41, AND circuits $A_1$, $A_2$ and $A_3$, counter 42 for self-timer photography, fixed counters 43 and 45, comparison circuits 39 and 45, inverters 40 and 47 and OR circuit $O_1$.

Explanation is hereinafter made of the operation of the first embodiment with the above construction. When selection member 15 is registered with indicium 16 to select the light blocking mode, neither a signal for operating display circuit 37 nor a "high" signal to AND circuit $A_1$ is generated and no voltage is applied to segment electrodes 24 and 28 or to whole transparent electrodes 23 and 27 so that the whole display portion of liquid crystal display device 14 looks dark, blocking the light toward framing mirror 20.

When selection member 15 is registered with indicium 17 or 18 to select one of the clock modes, selection circuit 36 causes a digital signal from clock circuit 35 representing an hour and a minute or a month and a day to be fed to display circuit 37. In accordance with the digital signal, a voltage is selectively applied to segment electrodes 24 and 28. As the result, when liquid crystal display device 14 is observed, numerals representing the hour and the minute or the month and the day looks transparent by the light reflection at framing mirror 20. In FIG. 1, camera 1 is set at the clock mode displaying an hour and a minute.

In the above light blocking mode and clock modes, switch $S_3$ is changed to the side (a). Accordingly, when cover member 11 is retracted from windows 7, 8 and 9 by the operation of operation member 10 to close switch $S_1$ and release button 6 is depressed, usual photography is performed. That is, with switch $S_2$ closed by depression of release button 6, transistor $T_2$ becomes conductive due to the bias by resistor $R_4$, thereby rendering transistor $T_1$ conductive. Even if switch $S_2$ is opened thereafter, transistors $T_1$ and $T_2$ are self-maintained to remain conductive. On the other hand, the closure of switch $S_2$ and the conduction of transistor $T_1$ make transistor $T_3$ conductive to cut off transistor $T_4$, whereby capacitor $C_1$ is instantly charged to a given level through resistor $R_1$ and switch $S_3$ to make transistors $T_5$ and $T_7$ conductive, and to cut off transistor $T_6$. Therefore, electromagnet $L_1$ is energized so that the shutter is released. Thereafter, an exposure is performed and switch $S_4$ is closed upon closure of the shutter to cut off transistor $T_2$ and $T_3$, thereby making transistor $T_4$ conductive. Then capacitor $C_1$ is discharged and transistor $T_1$ is cut off to be released from its self-maintained condition. Thereafter rotation of the disc film by one frame and the shutter cocking are performed and upon the completion of these operations, switch $S_4$ is opened again to enable a next photography. It should be noted that when emission of flash light is desired in the above usual photography, a not shown known flash light emission circuit may be made operative by the operation of operation member 5.

In the case of the self-timer photography mode wherein selection member 15 registers with indicium 9, switch S₃ is changed to the side (b) so that resistor R₂ is connected to capacitor C₁. In this case display circuit 37 applies a voltage to all segment electrodes 24 and 28 in response to the signal from selection circuit 36 and further the "high" signal from selection circuit 36 is fed to the respective first input terminal of AND circuits A₁ and A₂.

When release button 6 is depressed for photographing to close switch S₂, transistors T₁ and T₂ become conductive and transistor T₄ is cut off to start the charging of capacitor C₁ similarly to usual photography. However, at this time the charging of capacitor C₁ is effected through resistor R₂ and therefore transistor T₅ is not immediately made conductive due to the slow charging speed of capacitor C₁ so that a self-timer operation is performed. With switch S₂ closed and transistor T₁ conductive, a "high" signal is fed to the third input terminal of AND circuit A₁ connected to junction (g) between resistors R₃ and R₄. Accordingly, AND circuit A₁ allows the passage of the clock pulses from clock circuit 35 which are fed to the second input terminal of AND circuit A₁ and counter 42 counts the number of these pulses. However, until counter 42 counts the given number of pulses, that is, until 8 seconds have elapsed since AND circuit A₁ begins to allow passage of the pulses in response to the closure of switch S₂, the output of comparison circuit 39 is "low" and the output of inverter 40 is "high" causing AND circuit A₂ and OR circuit O₁ to generate "high" signals, whereby control circuit 41 constantly applies a voltage to whole transparent electrodes 23 and 27. At this time, as a voltage is also applied to all segment electrodes 24 and 28 from display circuit 37 as described above, the whole display portion of liquid crystal display device 14 becomes transparent to pass an incident light toward framing mirror 20 as well as to pass the light reflected at framing mirror 20 to the front. Accordingly, if a photographer stands in front of camera 1 after depressing release button 6, he or she can confirm by observation of framing mirror 20 whether he or she is within the range of the scene to be photographed.

When counter 42 for self-timer photography has counted the given number of clock pulses, i.e., for example, when 8 seconds have elapsed from the closure of switch S₂, the output of comparison circuit 39 becomes "high" and the output of AND circuit A₂ becomes "low". However, as the output of comparison circuit 45 still remains "high" at this time AND circuit A₃ is enabled instead and the clock pulses from clock circuit 35 pass through AND circuit A₃ and OR circuit O₁ and control circuit 41 applies a voltage cyclically to whole transparent electrodes 23 and 27 in accordance with the period of the clock pulses. At this time, as a voltage is constantly applied to electrodes 24 and 28, liquid crystal display device 14 changes its display periodically in an alternative fashion such that the whole display part becomes transparent, followed by darkening of a portion of the display part except the portions of segment electrodes 24 and 28. The alternative change of the display can be observed when liquid crystal display device 14 is viewed from the front, whereby a photographer in front of camera 1 can observe that the self-timer operation will soon finish causing a shutter release.

10 seconds after the closure of switch S₂, the voltage across capacitor C₁ reaches the given level to render transistors T₅ and T₇ conductive and to cut off transistor T₆. Electromagnet L₁ is then energized to cause a shutter release and the outputs of comparison circuit 45 and AND circuit A₃ become "low". However, as the output of inverter 47 becomes "high" to make the output of inverter 47 "high", control circuit 41 constantly applies a voltage to whole transparent electrodes 23 and 27. As a result, the whole display portion of liquid crystal display device 14 constantly becomes transparent, which informs a photographer of the shutter being released.

When the shutter closes thereafter, switch S₄ is closed to cut off transistors T₂ and T₃. Then transistor T₄ is made conductive to allow discharging of capacitor C₁ and transistor T₁ is cut off to be released from its self-maintained condition. Additionally, a reset signal resetting counter 42 is generated from exposure control circuit or motor drive circuit 44 upon the completion of the shutter closing or the shutting cocking so that camera 1 completes preparation for a next self-timer photography. However, as the output of comparison circuit 39 is "low" and the output of inverter 40 is "high" in this state, AND circuit A₂ as well as OR circuit O₁ generates a "high" signal respectively in response to the "high" output from selection circuit 36 so that a voltage is constantly applied to whole transparent electrodes 23 and 27 by control circuit 41. Further, as a voltage is constantly applied to all segment electrodes 24 and 28, the whole display part of liquid crystal display device 14 becomes transparent, whereby the range of the scene to be photographed can be observed by a photographer standing in front of camera 1 even in this state.

Figure 7:
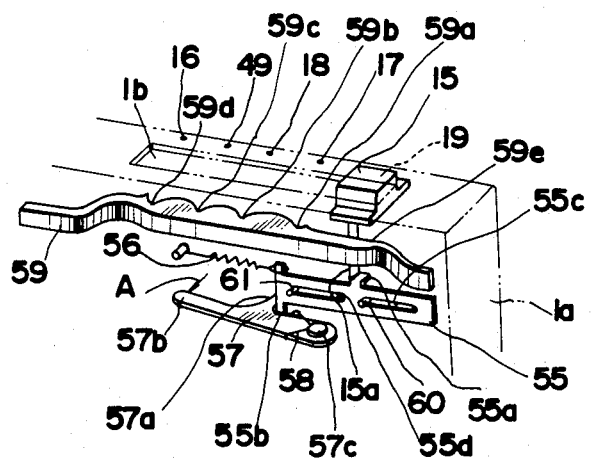
Figure 8:
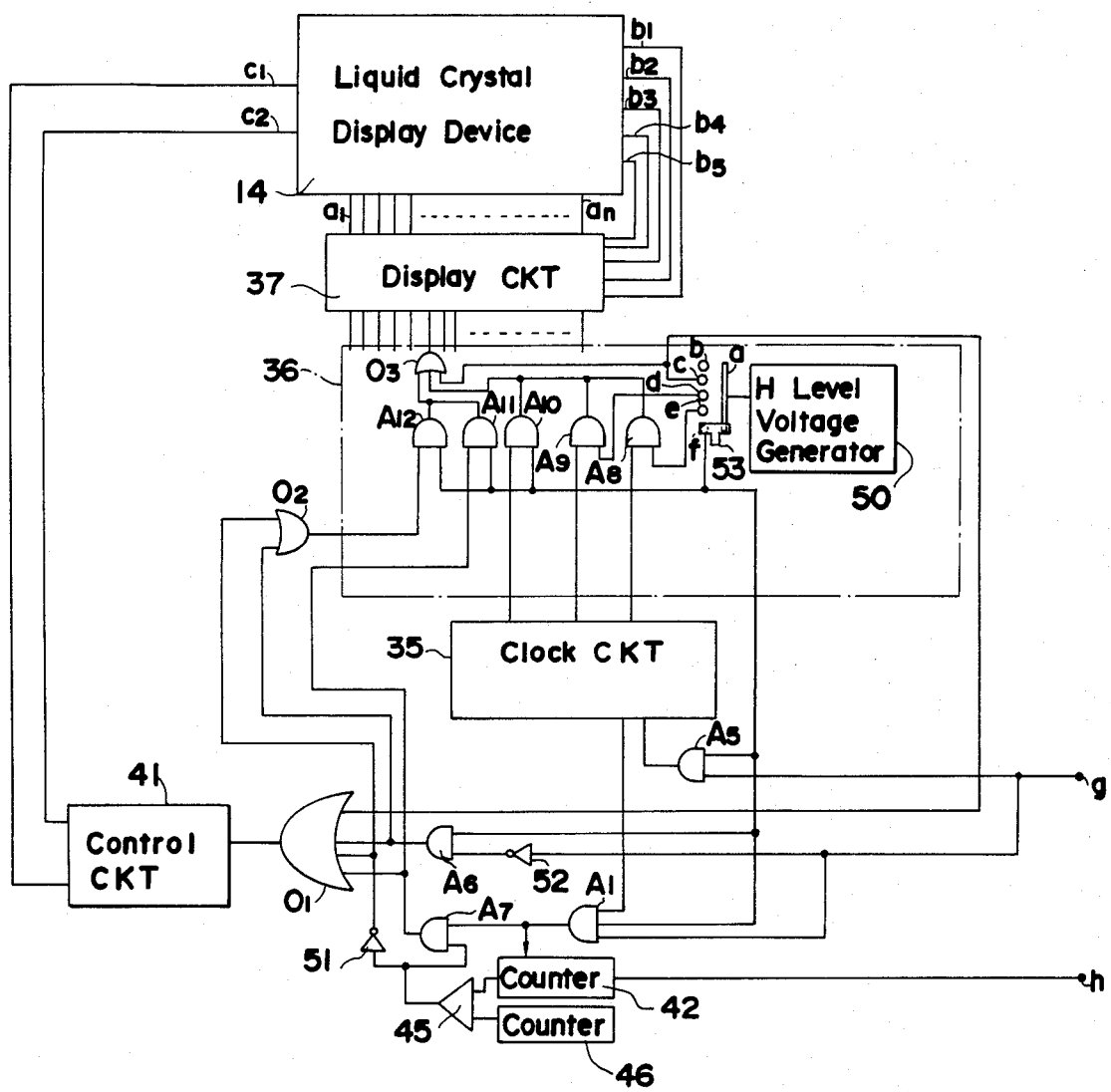

FIGS. 7 and 8 show the second embodiment which is adapted to inform a photographer of the advance of the self-timer operation by displaying numerals indicative of the elapse time by liquid crystal display device 14 until a shutter release and to make the whole display portion of liquid crystal device 14 transparent regardless of setting of the self-timer photography mode. In the Figures, the same numerals represent the same or similar devices as the numberals in FIGS. 1 and 6.

Referring to FIG. 7, mode selection number 15 provided with a pin 15a is mounted for movement along a groove 16 formed in the upper wall of the front projection portion 1a of camera 1 such that it can be registered with indicium 49 for setting of a framing mirror observation mode besides the setting of the light blocking mode, the clock mode displaying an hour and a minute and the clock mode displaying a month and a day and the self-timer mode. A click stop member 59 is made of an elastically deformable material like a plastic and fixed to camera 1 by its both ends. Pin 15a of selection member 15 is engageable with notches 59a, 59b, 59c and 59d formed on this click stop member 59. Notch 59a corresponds to the clock mode displaying an hour and a minute with selection member 15 registered with indicium 17, notch 59b corresponds to the clock mode displaying a month and a day with selection member 15 registered with indicium 18, notch 59c corresponds to the framing mirror observation mode with selection member 15 registered with indicium 49 and notch 59d corresponds to the light blocking mode with selection member registered with indicium 16. In the self-timer mode with selection member 15 registered with indicium 19, as shown in FIG. 7, pin 15a faces a flat portion 59e of click stop member 59. A member 55 biased to the left in FIG. 7 by a spring 56 is a restoring member for automatically restoring selection member 15 set at the self-timer photography mode position, to the position for setting the clock mode displaying an hour and a minute. Restoring member 55 includes a bent portion 55a which engages pin 15a from the right side in FIG. 7 and also a projection 55b which is releasably locked by a locking portion 57a of a locking lever 57. Locking lever 57 can be pivotted about an axis 57c and is biased clockwise by a spring 59 so as to engage projection 55b by locking portion 57a. For example, when a shutter completes closing, a not shown member moves in the direction of an arrow A, pushing an end 57b of locking lever 57 to pivot the locking lever counter-clockwise.

In FIG. 8, a movable contact piece 53 in selection circuit 36 is interconnected with mode selection member 15 and connects a contact (a) connected to a high level voltage generation circuit 50, to either contact (b), (c), (d), (e) or (f) in accordance with the set position of mode selection member 15. Contact (b) corresponds to the light blocking mode, contact (c) to the framing mirror observation mode, contact (d) to the clock mode displaying a month and a day, contact (e) to the clock mode displaying an hour and a minute and contact (f) to the self-timer photography mode, respectively. Though selection circuit 36 is provided with a group of OR circuits whose output terminals are connected to display circuit 37, only one of the OR circuits is shown by $O_3$ in FIG. 8 for brevity of the drawing. Display circuit 37 applies a voltage to segment electrodes 24 and 28 of liquid crystal device 14 through lines $a_1$ to $a_n$ and through lines $b_1$ to $b_5$ in accordance with the outputs of the OR circuits. AND circuits $A_8$ and $A_9$ inside selection circuit 36 are representative of a group of AND circuits to one input terminal of which digital signals displaying an hour and a minute from digital clock circuit 35 are fed and another group of AND circuits to one input terminal of which digital signals displaying a month and a day from digital clock circuit 35 are fed, respectively. The other input terminal of the respective AND circuits represented by $A_8$ is connected to contact (e) and that of the respective AND circuits represented by $A_9$ is connected to contact (d).

Digital clock circuit 35 is provided with a not shown subtraction counter which performs subtraction in response to each clock pulse and whose output terminal from the subtraction counter is connected to one of the input terminals of AND circuits represented by $A_{10}$. These AND circuits are provided for display of a value obtained by the subtraction by the subtraction counter. AND circuits $A_{11}$ and $A_{12}$ are solely provided, respectively. Contact (f) is connected to one input terminals of AND circuits $A_{11}$ and $A_{12}$ and to the other input terminal of AND circuits represented by $A_{10}$. A first input terminal of the respective OR circuits represented by $O_3$ is connected to contact (c) and a second input terminal thereof is connected to the output terminal of the corresponding one of the AND circuits represented by $A_8$, the output terminal of the corresponding one of the AND circuits represented by $A_9$ and the output terminal of the corresponding one of the AND circuits represented by $A_{10}$. Further, a third input terminal of the respective OR circuits is connected to the output terminal of AND circuit $A_{11}$ as well as to the output terminal of AND circuit $A_{12}$. Meantime, contact (b) is a floating or idle terminal.

Furthermore, contact (f) is also connected to one input terminal of each AND circuit $A_5$ and $A_6$ as well as to the second input terminal of AND circuit $A_1$. AND circuit $A_5$ is provided to start operation of the subtraction counter in clock circuit 35 and the other input terminal thereof is connected to the junction (g) between resistors $R_3$ and $R_4$. AND circuit $A_6$ generates a signal for applying a voltage to whole transparent electrodes 23 and 27 before switch $S_2$ is closed by release button 6 with the self-timer photography mode set. The other input terminal of AND circuit $A_6$ is connected to the junction (g) through an inverter 52. Junction (g) is also connected to the third input terminal of AND circuit $A_1$, the first input terminal of which is connected to the clock pulse output terminal of clock circuit 35. The output terminal of AND circuit $A_1$ is connected to counter 42 as in the first embodiment and to the other input terminal of AND circuit $A_7$ one input terminal of which is connected to the output terminal of comparison circuit 45. OR circuit $O_1$ includes a first terminal connected to contact (C), a second input terminal connected to the output terminal of AND circuit $A_6$, a third input terminal connected through inverter 51 to the output terminal of comparison circuit 45 and a fourth input terminal connected to the output terminal of AND circuit $A_7$. One input terminal of OR circuit $O_2$, the output terminal of which is connected to the other input terminal of AND circuit $A_{12}$, is connected through inverter 51 to the output terminal of comparison circuit 45, and the other input terminal thereof is connected to the output terminal of AND circuit $A_6$. Lines $c_1$ and $c_2$ connect control circuit 41 to whole transparent electrodes 23 and 27 of liquid crystal display device 14.

Explanation is next given of the operation of the second embodiment with the above construction. The camera is shown in FIGS. 7 and 8 in the state set for the self-timer photography mode with selection member 15 registering with indicium 19. At this time, as movable contact piece 53 connects contact (a) to contact (f), the "high" voltage signal generated by a high level voltage generating circuit 50 is fed to AND circuits $A_1$, $A_5$ and $A_6$, the AND circuits represented by $A_{10}$ and AND circuits $A_{11}$ and $A_{12}$. When release button 6 is depressed to close switch $S_2$ for start of the self-timer photography, the voltage at junction (g) becomes "high", thereby making the output of AND circuit $A_5$ "high" so that clock circuit 35 generates clock pulses to AND circuit $A_1$. At the same time, the subtraction counter operates and its output is fed to AND circuits represented by $A_{10}$. While the output of AND circuit $A_6$ is "low" because of the output of inverter 52 being "low", AND circuit $A_1$ allows passage of the clock pulses from clock circuit 35 since "high" signals are fed to its first and third input terminals. These clock pulses thus passing through AND circuit $A_1$ are then fed to counter 42 and AND circuit $A_7$ and pass through AND circuit $A_7$ to be fed to AND circuit $A_{11}$ and OR circuit $O_1$ as the output of comparison circuit 45 is "high" at this stage. AND circuit $A_{11}$ applies these clock pulses to all of the OR circuits represented by $O_3$. At this time the AND circuits represented by $A_{10}$ generate "high" or "low" signals in accordance with the signal from the subtraction counter inside clock circuit 35. For example, with the period of the clock pulses being one second and the width of one pulse being 0.5 second, "high" outputs among the outputs of the AND circuits represented by $A_{10}$ pass the corresponding OR circuits represented by $O_3$ during each 0.5 second when the clock pulses are in the "low" state. In contrast thereto, during each 0.5 second when the clock pulses are in the "high" state, the outputs of all of the OR circuits represented by $O_3$ become "high" corresponding to the state of the clock pulses, independently of whether the outputs of the AND circuits represented by $A_{10}$ are "high" or "low". On the other hand, the clock pulses passing through AND circuit $A_7$ are fed through OR circuit $O_1$ to control circuit 41 at this time. Therefore, if the self-timer operation period set by the subtraction counter of clock circuit 35 as its subtraction counting time is, for example, 10 seconds, display circuit 37 and control curcuit 41 at first serve to darken the display portion of liquid crystal display device 14 leaving only the segment portions corresponding to the numeral "10" transparent when the voltage at junction (g) becomes "high". Then, the whole display of the liquid crystal device is rendered transparent for 0.5 second, after which it is darkened for the next 0.5 second with only the segment portions corresponding to the numeral "9" left transparent. Thereafter similar displays are repeated every 0.5 second in an alternative fashion such that the display portion of the liquid crystal device at a moment becomes wholly transparent and at the next moment becomes dark leaving its segment portions corresponding to the numeral which represents the period left for the self-timer operation. 10 seconds after junction (g) became "high", the output of comparison circuit 45 becomes "low", whereby the outputs of inverter 51, OR circuits $O_1$ and $O_2$, and AND circuit $A_{12}$ constantly become "high", while AND circuit $A_7$ is disabled.

As the outputs of all of the OR circuits represented by $O_3$ also become "high", the whole display portion of liquid crystal display device 14 is rendered transparent constantly by display circuit 37 and control circuit 41.

Upon the termination of the self-timer photography, switch $S_4$ is closed as described in connection with the first embodiment to drop the voltage at junction (g) to a "low" level and to raise the outputs of inverter 52 and AND circuit $A_6$ to a "high" level respectively, whereby the outputs of OR circuits $O_1$ and $O_2$ and the output of all of the OR circuits represented by $O_3$ remain "high" so that the whole display portion of liquid crystal display device 14 remains transparent. At the same time or at the time of shutter cocking for the next photography, counter 42 is reset by a reset signal from terminal (h) of exposure control circuit or motor drive circuit 44. Upon the termination of the self-timer photography, stop lever 57 is pivotted counterclockwise by the not shown member to disengage stop portion 57a from projection 55b whereby restoring member 55 is moved leftward by the force of spring 56 so that bent portion 55a pushes pin 15a. Therefore, selection member 15 is also moved leftward and stopped when pin 15a pressing click stop member 59 engages notch 59a, whereby movable contact piece 53 connects contact (a) to contact (e) to set the clock mode displaying an hour and a minute.

However, if selection member 15 is moved rightward in FIG. 7 to continue self-timer photography, pin 15a pushes bent portion 55a to move restoring member 55 rightward against spring 56 so that projection 55b of restoring member 55 engages locking portion 57a of lock lever 57. At the same time, pin 15a is released from notch 59a to face flat portion 59e of the click member. In this state, AND circuit $A_6$ generates a "high" signal because movable contact piece 53 connects contact (a) to contact (f) again and the voltage at junction (g) is kept "low", whereby all outputs of OR circuits $O_1$ and $O_2$, AND circuit $A_{12}$ and the OR circuits represented by $O_3$ become "high". Accordingly, the whole display portion of liquid crystal display device 14 is made transparent by display circuit 37 and control circuit 41 to enable the observation of framing mirror 20 from the front of camera 1 before start of the photography.

When selection member 15 registers with indicium 59b in case of the clock mode display an of hour and a minute, movable contact piece 53 connects contact (a) to contact (e) to apply the "high" voltage from high level voltage generation circuit 50 to one input terminal of each AND circuit represented by $A_8$. Accordingly, the AND circuits represented by $A_8$ allow passage of a digital signal displaying an hour and a minute from clock circuit 35 to the OR circuits group represented by $O_3$. As the digital signal also passes through these OR circuits, display circuit 37 causes liquid crystal display device 14 to become transparent at the positions of the segment electrodes that form the numerals representing the hour and the minute as well as to become dark at the rest of the display portion.

When selection member 15 is moved leftward until pin 15a engages notch 59b of click stop member 59, it registers with indicium 18 so that the clock mode displaying a month and a day is set. In this state, movable contact piece 53 connects contact (a) to contact (d), whereby the "high" voltage from high level voltage generation circuit 50 is fed to one input terminal of each AND circuit represented by $A_9$. Accordingly, a digital signal displaying a month and a day from clock circuit 35 passes through the AND circuits represented by $A_9$ and the OR circuits represented by $O_3$ and is applied to display circuit 37, which in turn causes liquid crystal display device 14 to become transparent at the position of the segment electrodes that form the numerals representing the month and the day as well as to become dark at the rest of the display portion.

When selection member 15 is further moved leftward until pin 15a engages notch 59c of click stop member 59, it registers with indicium 49 and the framing mirror observation mode is set. In this state, movable contact piece 53 connects contact (a) to contact (c), whereby the "high" voltage from high level voltage generation circuit 50 is applied through all of the OR circuits represented by $O_3$ to display circuit 37 and also through OR circuit $O_1$ to control circuit 41. As a result, the whole display portion of liquid crystal display device 14 is made transparent by display circuit 37 and control circuit 41 in this mode. That is, framing mirror 20 can be observed from the front of camera 1 in spite of the self-timer photography mode not being set.

When selection member 15 is still further moved leftward until pin 15a engages notch 59d, it registers with indicium 16. Movable contact piece 53 in this state connects contact (a) to contact (b), whereby no signal is applied to both display circuit 37 and control circuit 41 so that the whole display portion of liquid crystal display device 14 becomes dark. Hence the mode set in this state is the light blocking mode.

In any of the two clock modes, the framing mirror observation mode and the light blocking mode, photographing is performed immediately after depression of release button 6 and restoring member 55 rests at the position moved most leftward in FIG. 7, with the right ends of its guide grooves 55c and 55d being engaged with guide pins 60 and 61.

Figure 9:
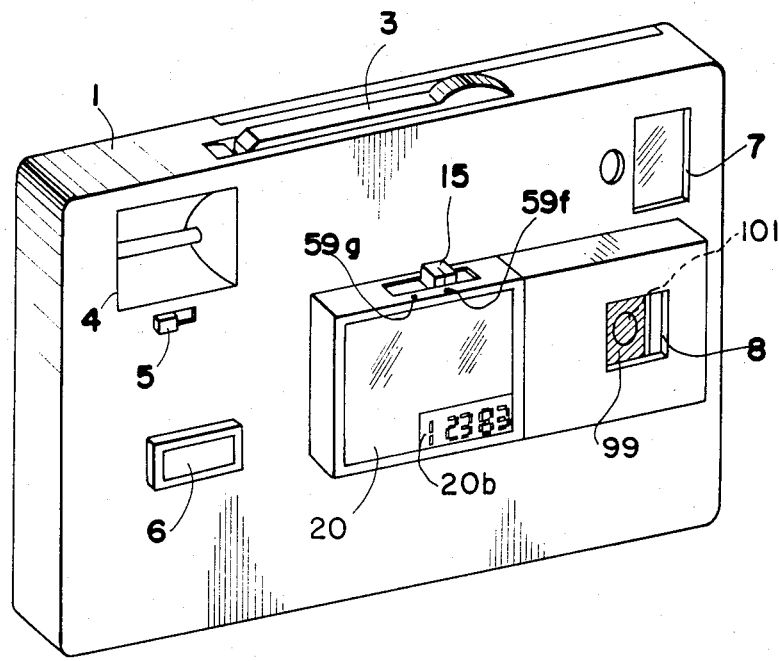
FIG. 9 is a view similar to FIG. 1, showing the appearance of the camera according to the third embodiment of the present invention.
Figure 10:
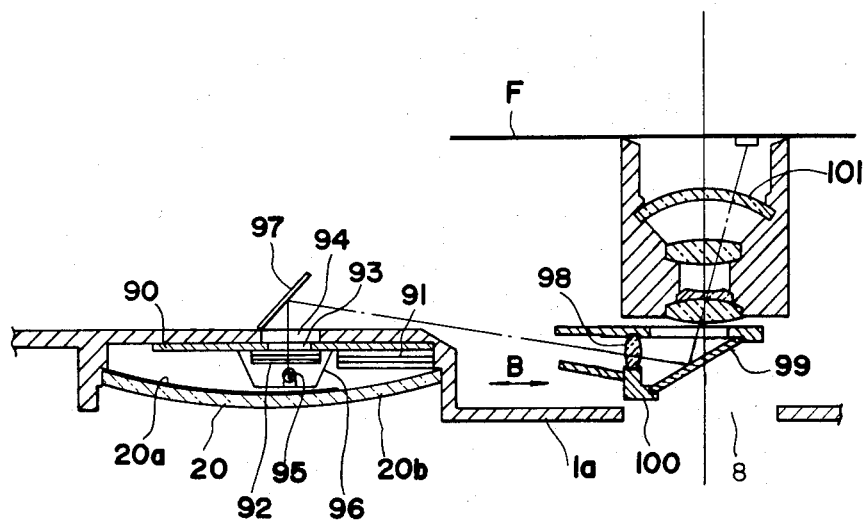
FIG. 10 is a horizontal cross-sectional view of an essential part of the camera shown in FIG. 9.

Referring to FIGS. 9 and 10 showing the third embodiment, framing mirror 20 is formed by evaporation of a metallic material 20a such as a silver or aluminium at its rear face and partially made transparent at its marginal portion, e.g., a lower right corner portion 20b as shown. On front wall $1_a$ of camera 1 behind the framing mirror there is fixedly provided a base plate 90 supporting first and second liquid crystal display devices 91 and 92. First liquid crystal display device 91 is of a light reflection type and arranged behind transparent portion 20b of the framing mirror so as to be observed from the front of the camera. Second liquid crystal display device 92 is of a light transmission type and arranged adjacent to the first liquid crystal display device to align with an opening 93 of base plate 90 and an opening 94 of front wall 1a. The first and second liquid crystal display devices are driven to display common data by a not shown circuit means including a digital clock circuit. A light source 95 such as a lamp is arranged between framing mirror 20 and second liquid crystal display device 92 and a mask 96 is fixed to base plate 90 to cover the light source and the second liquid crystal display device.

A mirror 97 fixed to front wall 1a constitutes a data recording optical system together with a lens 98 and a half-mirror 99 fixed to a movable frame 100. This movable frame 100 is interlocked with mode selection member 15 and movable in the direction of arrow B between a first position where half-mirror 99 is located in front of a picture taking lens 101 and a second position where the half-mirror is retracted from the front of the picture taking lens. In this third embodiment, mode selection member 15 is movable between two positons, i.e., a data recording mode setting position where it registers with indicium 59f and a normal mode setting position where it is registered with indicium 59g. Movable frame 100 is at the first position with mode selection member 15 set to the data recording mode setting position and at the second position with mode selection member 15 set to the normal mode setting position, respectively. The data recording optical system constituted by mirror 97, lens 98 and a half-mirror 99 is provided for transmitting a light from light source 95, which has passed through second liquid crystal display device 92, toward a given position on the focal plane of picture taking lens 101 through the picture taking lens. The position 20b of framing mirror 20 at which it is made transparent corresponds to the given position of the focal plane, such that the common data can be observed from the front of camera 1 at the same position as it is recorded on a disc film F located on the focal plane.

When mode selection member 15 is moved to the data recording mode setting position as shown, light source 95 is lit at a proper timing, for example, upon opening of a not shown shutter. The light from the light source illuminates second liquid crystal display device 92 and passes therethrough toward mirror 97. Then it is reflected by the mirror and passes through lens 98 to be reflected by half-mirror 99 toward the given position on the focal plane of picture taking lens 101. Thus when a disc film F is located on the focal plane, the data displayed by second liquid crystal display device 92 is recorded on the film together with the scene which is photographed through picture taking lens 101 and half-mirror 99. At this time, if a person stands in front of camera 1, he or she can observe the same data displayed by first liquid crystal display device 91 through transparent portion 20b of framing mirror 20.

In contrast, when mode selection member 15 is moved to the normal mode setting position where it registers with indicium 59g, movable frame 100 is moved leftward so that half-mirror 99 is retracted from the front of picture taking lens 101. Accordingly, no data is recorded on the film but only the scene is photographed through the picture taking lens.

Meanwhile, it is possible to use a liquid crystal display device of a light transmission type as first liquid crystal display device 91 if a light source such as an EL (electro luminescence) panel is arranged behind it.

Although three preferred embodiments of the present invention are specifically disclosed with reference to the accompanying drawings, it should be understood that the present invention is not limited to those embodiments.

For example, the first and second embodiments can be modified such that liquid crystal display device 14 displays characters other than numerals or patterns by replacement of its electrodes and the display circuit therefor. In this connection, it is even possible to have the liquid crystal display device serve as a so-called game watch, which displays not only a time but also various game patterns changing timewise automatically and/or by manual operations. Needless to say, the liquid crystal display device can be driven either by static drive or by dynamic drive. Additionally, the display of the characters or patterns may be modified such that the portions representing the characters or patterns become dark leaving the remaining portions transparent. Furthermore, in the case where the liquid crystal display device is modified to have its display portion divided into a plurality of display portions by changing the arrangement of its transparent electrodes, the elapse of the time of the self-timer operation may be such that the display portions made transparent at the start of the self-timer operation become dark in order with the elapse of the time. Still further, liquid crystal display device 14 is not necessarily fixedly provided in front of framing mirror 20. For example, a construction is possible in which liquid crystal display device 14 is supported for sliding movement between a position covering framing mirror 20 and a position uncovering the framing mirror or in which liquid crystal display device 14 is pivotably supported at a position above the upper side of the framing mirror. In such a construction, observation of the framing mirror with no brightness loss becomes possible.

What is claimed is:

1. A camera comprising:
 a picture taking lens;
 a window for said picture taking lens arranged at a front part of said camera;
 a framing mirror having a relatively large size and arranged at the front part of said camera adjacent to said window such that a person standing in front of said camera at a position within the range of the scene to be photographed can confirm the range of the scene to be photographed through observation of said framing mirror;
 a liquid crystal display device having a display portion and disposed in front of said framing mirror;
 a mode selection member operable for setting various operation modes; and circuit means coupled to said mode selection member for changing the state of the display portion of said liquid crystal display device in accordance with the operation mode set by said mode selection member, said circuit means causing the whole display portion of said liquid crystal display device to become transparent when at least one of the operation modes is set by said mode selection member.

2. A camera as defined in claim 1, wherein said mode selection member in operable to set a self-timer photography mode, in which said circuit means causes the whole display portion of said liquid crystal display device to become transparent.

3. A camera as defined in claim 1, wherein said mode selection member is operable to set a light blocking mode, in which said circuit means causes the whole display portion of said liquid crystal display device to become dark.

4. A camera as defined in claim 1, wherein said mode selection member is operable to set a self-timer photography mode, in which said circuit means causes said display portion of said liquid crystal display device to become periodically transparent at positions forming numerals or patterns representing the lapse of a self-timer operation.

5. A camera as defined in claim 4, wherein said circuit means causes the whole display portion of said liquid crystal display device to become transparent at intervals during which the display portion does not become transparent at said positions forming the numerals or patterns representing the lapse of the self-timer operation.

6. A camera as defined in claim 2, wherein said circuit means causes the display portion of said liquid crystal display device to change its state distinguishably immediately before termination of a self-timer operation.

7. A camera as defined in claim 1, wherein said circuit means includes a clock circuit for generating a signal representing a time and said mode selection member is operable for setting a clock mode, in which said circuit means causes the display portion of said liquid crystal display device to become transparent in response to said signal from said clock circuit at position forming numerals representing the time.

8. A camera as defined in claim 1, wherein said mode selection member is operable to set a framing mirror observation mode, in which said circuit means causes the whole display portion of said liquid crystal display device to become transparent.

9. A camera comprising:
a picture taking lens;
a window for said picture taking lens arranged at a front part of said camera;
a framing mirror having a relatively large size and arranged at the front part of said camera adjacent to said window such that a person standing in front of said camera at a position within the range of the scene to be photographed can confirm the range of the scene to be photographed through observation of said framing mirror, said framing mirror having a transparent portion at a given marginal portion;
a first liquid crystal display device of a light reflection type arranged behind said transparent portion of said framing mirror;
a second liquid crystal display device of a light transmitting type arranged adjacent to said first liquid crystal display device behind said framing mirror;
a light source for emitting a light toward said second liquid crystal display device, said light source being arranged between said framing mirror and said second liquid crystal display device;
a data recording optical system for transmitting the light from said light source having passed through said second liquid crystal display device towards a given position of a focal plane of said picture taking lens through said picture taking lens, said given position of said marginal portion of said framing mirror corresponding to said given position of said focal plane of said picture taking lens; and circuit means for causing said first and second liquid crystal display device to display of common data.

10. A camera as defined in claim 9, further comprising a mode selection member operable to a plurality of positions including a data recording position for setting a data recording mode, said circuit means being mode operative with said mode selection member set to said data recording position.

11. A camera as defined in claim 10, wherein said data recording optical system includes a half-mirror movable between a first position located in front of said picture taking lens and a second position retracted from the front of said picture taking position, said half-mirror being interlocked with said mode selection member so as to be moved to said first position only with said mode selection member set to said data recording position.

12. In a camera:
a forwardly facing framing mirror;
a liquid crystal display member located in front of the mirror; and
control means for selectively transferring said liquid crystal display member between an overall transparent condition affording visual access to said mirror from a position in front of said mirror and an at least partially opaque condition at least partially masking said mirror.

13. In the camera of claim 12, wherein said control means includes a circuit for actuating said display device to display data thereon.

14. In the camera of claim 12, wherein said control means includes means for selectively rendering said liquid crystal display member overall transparent or overall opaque.

15. In the camera of claim 12, wherein the field of view of said mirror substantially coincides with the field of view of said camera.

16. In the camera of claim 12, wherein said mirror is forwardly convex.

* * * * *